Sept. 20, 1966 P. M. L. ELSTONE 3,273,829
AIRCRAFT
Filed Dec. 17, 1962 3 Sheets-Sheet 1
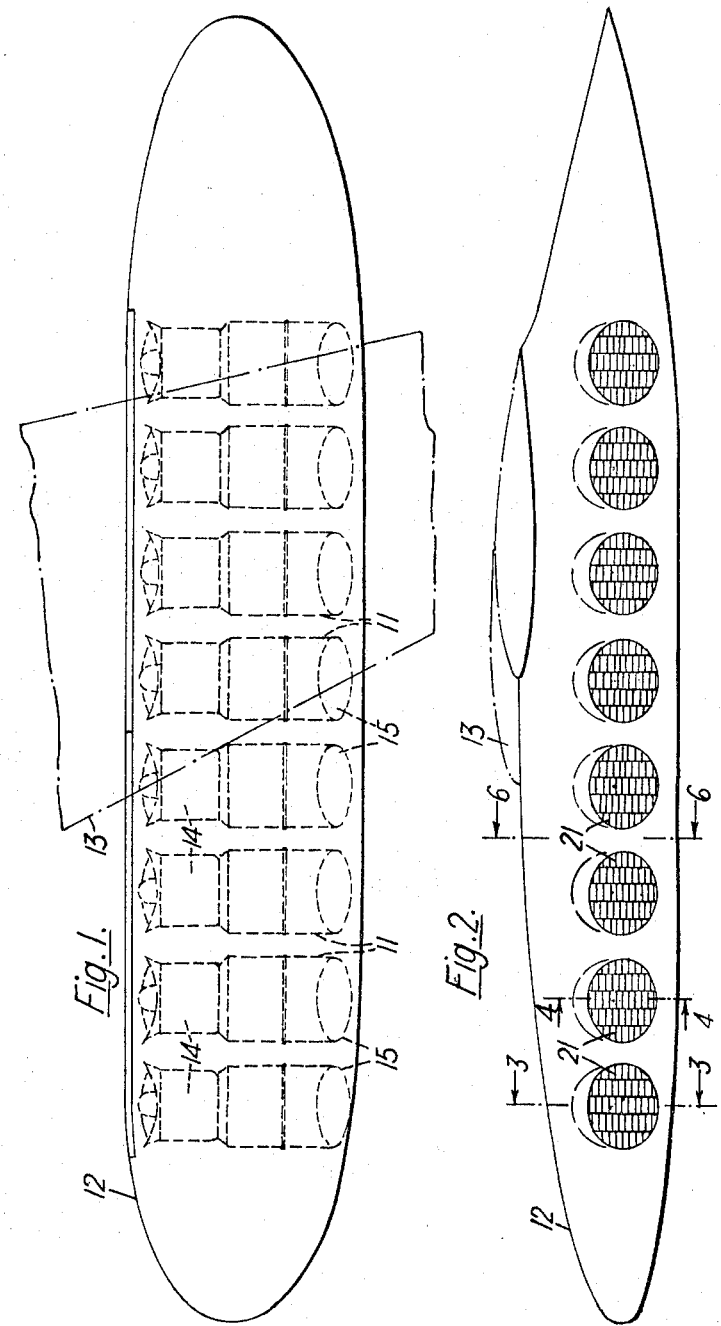

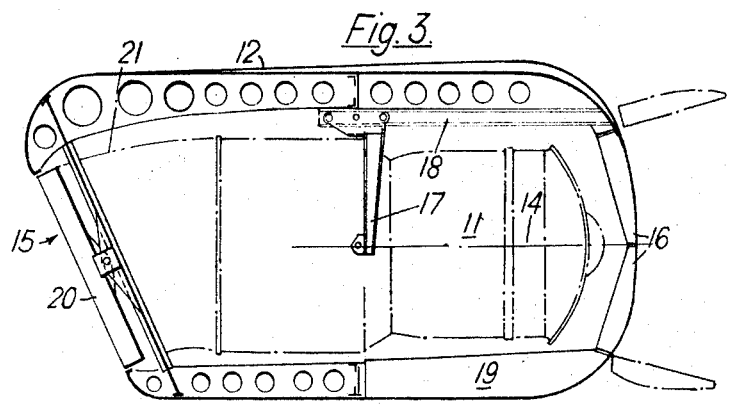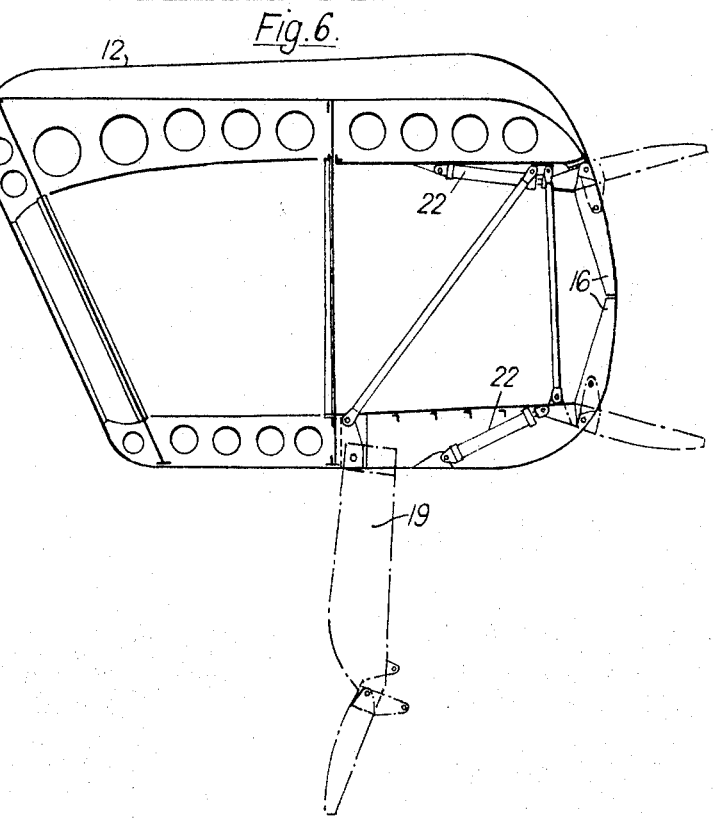

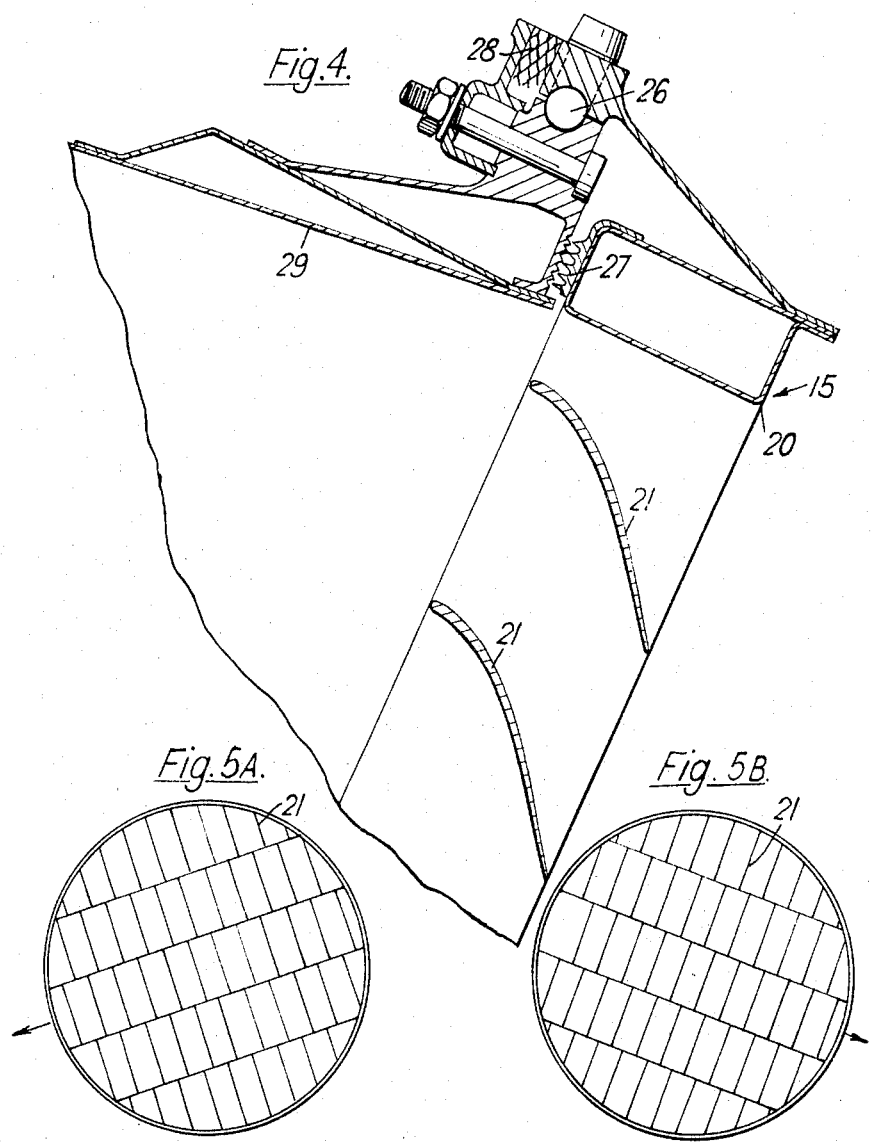

United States Patent Office 3,273,829
Patented Sept. 20, 1966

3,273,829
AIRCRAFT
Paul Maxwell Lawrence Elstone, Winscombe, England, assignor to Hawker Siddeley Aviation Limited, Kingston-upon-Thames, England, a British company
Filed Dec. 17, 1962, Ser. No. 246,870
Claims priority, application Great Britain, Dec. 18, 1961, 45,372/61
8 Claims. (Cl. 244—54)

This invention relates to aircraft. More particularly, it is concerned with the mounting of lift engines on an aircraft in order to give it a short take off and landing capability; such lift engines can, for example, be mounted in pods carried on the aircraft wings.

Since a lift engine is provided to give upthrust it is conventional to mount these engines with their axes vertical or substantially so.

According to the present invention, one or more jet lift engines are set with their axes substantially athwart the direction of flight and are provided with jet exit nozzles arranged so as to be capable of deflecting the jet efflux of each engine downwardly, these nozzles being adjustable to enable the jet effluxes to be directed at will to give a component of thrust in the fore and aft direction as well as upthrust, when desired.

The engines may be mounted in a pod on an aircraft wing, with their axes preferably horizontal and at right-angles to the direction of flight, and each can be provided with a jet pipe fitted with a nozzle that turns the gas stream into a direction substantially at right-angles to the engine axis. Each nozzle can be a swivelling nozzle embodying cascade vanes.

Thus, by setting the nozzles so that they direct the jet effluxes not vertically downward but downwardly and rearwardly, to give forward thrust as well as upthrust on the aircraft, a short run take off can be achieved during which the lift engines provide forward propulsive effort and their component of upthrust is augmented by lift from the wings. It is also possible to arrange the nozzles to swivel in the opposite direction from the position in which they give no fore and aft thrust component, so that they apply to the aircraft reverse thrust instead of forward thrust, for example for use on landing.

The employment of swivel nozzles means that the lift engine thrust vector is not dependent on the aircraft attitude in the way that it would be in the case of vertically-mounted engines. Furthermore, the engines can be started and run up to speed with the nozzles directed aft, the nozzles being swung down only at the instant of take off so that ground erosion is much less.

One arrangement in accordance with the invention will now be described by way of example and with reference to the accompanying diagrammatic drawings, in which:

FIGURE 1 is a plan view of a lift pod mounted on an aircraft wing,

FIGURE 2 is an elevation of the pod looking inboard,

FIGURE 3 is a view in section on the line 3—3 of FIGURE 2,

FIGURE 4 is a view in section on the line 4—4 of FIGURE 2,

FIGURES 5A and 5B illustrate different angular settings of an engine jet nozzle of the arrangement, and FIGURE 6 is a view in section on the line 6—6 of FIGURE 2.

In the arrangement shown in the drawings, a comparatively large number of engines 11, eight as illustrated, are mounted in a pod 12 carried under the wing 13 of an aircraft with their axes 14 horizontal and at right-angles to the direction of flight, each engine having its jet efflux directed through an opening 15 in the pod wall (FIGURES 3 and 4) at the outboard side of the pod. On the inboard side of the pod there are doors 16 that can be opened by jacks 22 (FIGURE 6) to provide air intakes for the engines, these doors being closed when the lift engines are not in use. The engines 11 are in a row along the pod 12 spaced equidistantly from one another, and the intake doors 16 are in pairs with each pair providing the intake openings for several engines; in the case of the eight engines shown there are two pairs of doors, each pair uncovering the intake area for four engines.

Each engine 11 is carried on a type of three-point mounting within the pod and it is an advantage to provide engine side mounting brackets 17 that can travel on rails 18 built on to the pod internal structure so as to facilitate engine removal and replacement; these rails will also accommodate engine expension. As a further assistance toward engine removal, part of the lower wall or floor of the pod is arranged to hinge downwardly as shown in FIGURE 6. This downwardly-hinging part 19 of the floor is toward the side of the pod where lie the engine intakes, and the lower one of each pair of intake doors 16 is carried by the part of the pod floor that hinges down so that a large withdrawal-opening for the engine at the intake side results.

The direction of the jet efflux of each engine 11 is controlled by a swivelling nozzle 20 mounted in the jet opening 15 of the pod wall corresponding to that engine. The nozzle is mounted with its axis at an angle of, say, 25° to the horizontal and it embodies cascade vanes 21 that act to direct the jet stream vertically downward, or almost so, when the swivel nozzle is in the particular position of rotation shown in FIGURE 2. Upon rotation of the nozzle about its axis from that position in one direction or the other, the cascades 21 turn and as a result the jet stream is directed to an increasing extent in a fore and aft direction, either rearwardly as in FIGURE 3B or forwardly as in FIGURE 3A, depending on the direction of rotation, as well as downwardly. Thus, within the limits of angular rotation of the nozzle 20, any desired combination of an upthrust component and a forward or reverse thrust component can be selected as required.

FIGURE 4 of the drawings shows how each swivelling nozzle is mounted on the jet pipe outlet of the corresponding engine upon a ball bearing assembly 26, with an inner gas seal 27 of the labyrinth type and an outer seal 28. The jet pipe 29 itself is slightly curved and is secured to internal members of the pod structure thereby constituting the third point of support in the aforementioned three-point engine mounting, the other two support points being at the side brackets 17.

While the arrangement illustrated shows a single row of lift engines along the pod, the scope of the invention is not limited to this and there could be two or more rows one above another. Also the mounting of the engines is not limited to the case in which the engine axes are precisely horizontal or precisely at right-angles to the direction of flight.

I claim:

1. A pod structure for attachment to an aircraft to give it a short take-off and landing capability, comprising a pod floor, opposite side walls and a top wall all defining internal pod chambers, openings in said opposite side walls communicating with said chambers, a plurality of jet lift engines each having an air intake end and a gas effluent exit end and being mounted in said chambers at intervals along the pod in the fore-and-aft direction, each engine being disposed with its longitudinal axis substantially horizontal and across the direction of flight and having its intake end directed toward a first of said side wall openings at one side of the pod and its exit end directed toward a second side wall opening at the opposite side of the pod, and a jet nozzle mounted on the exit end of each engine and disposed to direct the engine jet efflux out through said second side wall opening, each said jet nozzle comprising means to turn the jet efflux through an appreciable angle with respect to the engine axis so as to deflect the efflux downwardly in the short take-off and landing condition, and said nozzle means being angularly adjustable about said axis of the respective engine to direct the jet efflux rearwardly.

2. A pod structure for attachment to an aircraft to give it a short take-off and landing capability, comprising pod walls defining internal pod chambers, with openings in said pod walls communicating with said chambers, a plurality of jet lift engines each having an air intake end and a gas efflux exit end and the engines being mounted in said chambers at intervals along the pod in the fore-and-aft direction, each engine being disposed with its longitudinal axis substantially horizontal and athwart the direction of flight and having its intake end directed toward a first of said openings in the pod walls and its exit end directed toward a second of said openings, and nozzle means mounted on the exit end of each engine and disposed to direct the egine jet efflux out through said second wall opening, each said nozzle means turning the jet efflux of the respective engine through an angle so as to deflect the efflux downwardly in the short take-off and landing condition, and said nozzle means further being adjustable to direct the jet efflux rearwardly.

3. A pod structure for attachment to an aircraft to give it a short take-off and landing capability, comprising a pod floor, opposite side walls and a top wall together defining internal pod chambers, openings in said opposite side walls communicating with said chambers, a plurality of jet lift engines each having an air intake end and an exit end, said engines being mounted in said chambers at intervals along the pod, and each engine being disposed with its axis substantially horizontal and substantially at right-angles to the direction of flight and having its intake end directed toward a first side wall opening at an inboard side of the pod and its exit end directed toward a second side wall opening at the outboard side of the pod, and a jet nozzle mounted on the exit end of each engine and disposed to direct the engine jet efflux out through said outboard second side wall opening, each said jet nozzle comprising means turning the jet efflux through an angle with respect to the engine axis to deflect the efflux downwardly in the short take-off and landing condition said nozzle means being angularly adjustable to direct the jet efflux rearwardly.

4. An assembly according to claim 1, wherein the nozzle for each engine is a swivelling nozzle embodying cascade vanes.

5. An assembly according to claim 1, wherein the nozzle is angularly adjustable in opposite directions from a position in which the jet stream is directed downwardly, so as to direct the jet downwardly and rearwardly or downwardly and forwardly as the case may be.

6. An assembly according to claim 1, wherein the pod is arranged for attachment to an aircraft wing, the engine jet pipes being directed toward the outboard side of the pod and at least one pair of air intake doors disposed at the inboard side.

7. An assembly according to claim 1, wherein each engine has a three-point mounting within the pod, including mounting members arranged to slide on guide rails for easy withdrawal or insertion of an engine.

8. An assembly according to claim 1, wherein parts of the floor of the pod are arranged to hinge downwardly to create a large opening for engine withdrawal.

References Cited by the Examiner

UNITED STATES PATENTS

| 2,783,003 | 2/1957 | Ralston et al. | 244—54 |
| 2,879,014 | 3/1959 | Smith et al. | 244—52 X |
| 2,885,159 | 5/1959 | Ashwood | 244—23 X |
| 2,968,920 | 1/1961 | Wayne et al. | 244—54 X |
| 3,066,889 | 12/1962 | Kelly | 244—12 |

FOREIGN PATENTS 756,054   8/1956   Great Britain.

MILTON BUCHLER, *Primary Examiner.*

SAMUEL FEINBERG, *Examiner.*

P. F. STAHL, L. C. HALL, *Assistant Examiners.*